United States Patent
Taniguchi et al.

(10) Patent No.: US 12,391,186 B2
(45) Date of Patent: Aug. 19, 2025

(54) STORAGE DEVICE AND COVER MEMBER FOR THE STORAGE DEVICE

(71) Applicant: NIFCO INC., Yokosuka (JP)

(72) Inventors: Katsuhiko Taniguchi, Yokosuka (JP); Atsushi Doi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 428 days.

(21) Appl. No.: 17/762,170

(22) PCT Filed: Aug. 12, 2020

(86) PCT No.: PCT/JP2020/030680
§ 371 (c)(1),
(2) Date: Mar. 21, 2022

(87) PCT Pub. No.: WO2021/075137
PCT Pub. Date: Apr. 22, 2021

(65) Prior Publication Data
US 2022/0371521 A1 Nov. 24, 2022

(30) Foreign Application Priority Data
Oct. 15, 2019 (JP) .................................. 2019-188618

(51) Int. Cl.
*B60R 7/04* (2006.01)
*B60N 3/10* (2006.01)
*B60R 11/00* (2006.01)

(52) U.S. Cl.
CPC .................. *B60R 7/04* (2013.01); *B60N 3/10* (2013.01); *B60R 2011/0007* (2013.01)

(58) Field of Classification Search
CPC ..... B60R 7/04; B60R 2011/0007; B60N 3/10; B65D 43/20
(Continued)

(56) References Cited

U.S. PATENT DOCUMENTS 6,419,379 B1 * 7/2002 Hulse ..................... B60N 3/102
362/511
7,735,538 B2 * 6/2010 Ogawa ..................... E06B 9/15
312/297
(Continued)

FOREIGN PATENT DOCUMENTS

| CN | 103963715 B | * | 2/2016 | ............. A45C 13/16 |
| CN | 103158626 B | * | 9/2016 | ............. B23P 11/00 |

(Continued)

OTHER PUBLICATIONS

PCT/ISA/210, "International Search Report for International Application No. PCT/JP2020/030680," Oct. 27, 2020.

*Primary Examiner* — Joseph D. Pape
(74) *Attorney, Agent, or Firm* — HAUPTMAN HAM, LLP

(57) ABSTRACT

Provided are a storage device and a cover member for the storage device with which a gap that exposes an internal structure can be shielded without degrading design. In the cover body for the storage device, a gap is formed between an end section of a shutter and upper left and right surface decoration sections, the end section of the shutter on the gap side is formed by a shielding member, and the shielding member extends toward between the upper left or right surface decoration section and a frame-side rail and reaches a lower side of each of the upper left and right surface decoration sections.

10 Claims, 4 Drawing Sheets

(58) Field of Classification Search
USPC .................................................. 296/24.34
See application file for complete search history.

(56) References Cited

U.S. PATENT DOCUMENTS

| | | | | |
|---|---|---|---|---|
| 9,004,312 B2* | 4/2015 | Kodama | ................... | B60R 7/04 |
| | | | | 312/297 |
| 10,189,414 B1* | 1/2019 | Huebner | ................ | B60N 2/793 |
| 10,377,317 B2* | 8/2019 | Ranganathan | ......... | B60N 2/793 |
| 10,857,946 B2* | 12/2020 | Taniguchi | ................. | B60R 7/04 |
| 2008/0129071 A1* | 6/2008 | Hipshier | ................... | B60R 7/04 |
| | | | | 296/1.08 |
| 2010/0066113 A1* | 3/2010 | Browne | ................. | B60N 2/793 |
| | | | | 296/24.34 |
| 2019/0193651 A1* | 6/2019 | Salewski | ................ | B60N 3/106 |
| 2023/0192002 A1* | 6/2023 | Boinais | .................... | B60R 7/04 |
| | | | | 296/37.8 |

FOREIGN PATENT DOCUMENTS

| | | | | | |
|---|---|---|---|---|---|
| DE | 10107286 | C1 | * | 5/2002 | ............ B60R 11/00 |
| EP | 1304439 | A2 | * | 4/2003 | ............... B60R 7/04 |
| JP | 2012-166654 | A | | 9/2012 | |
| JP | 2013-204256 | A | | 10/2013 | |
| JP | 2013204256 | | * | 10/2013 | |
| JP | 2016-205090 | A | | 12/2016 | |
| KR | 20100135652 | A | * | 12/2010 | |
| KR | 20160128215 | A | * | 11/2016 | |

* cited by examiner

STORAGE DEVICE AND COVER MEMBER FOR THE STORAGE DEVICE

RELATED APPLICATIONS

The present application is National Phase of International Application No. PCT/JP2020/030680 filed Aug. 12, 2020, and claims priority from Japanese Application No. 2019-188618, filed Oct. 15, 2019, the disclosure of which is hereby incorporated by reference herein in its entirety.

FIELD OF THE INVENTION

The present invention relates to a storage device for storing an item to be stored, and a cover member for the storage device.

BACKGROUND OF THE INVENTION

A vehicle has a type provided with a console box in which an item to be stored, such as accessories, can be stored in a center console. In the console box, there is a type wherein in an opening of a case in a box shape, the opening can be opened and closed by sliding a lid. In the sliding type console box, since a gap is formed between the case and a shutter, an interior structure can be seen through the gap to degrade an appearance. In such a situation, a cover and so on for covering the gap is attached.

As a conventional sliding type console box, for example, there is an article storage device for a vehicle disclosed in the following Patent Document 1. In the article storage device for the vehicle, projections and dents formed by a decorating plate which is an edge of the case and the shutter which is a lid, are disliked, and the decorating plate and the shutter are formed on a same plane.

PRIOR ART DOCUMENT

Patent Document

Patent Document 1: Japanese Patent Publication No. 2012-166654

SUMMARY OF THE INVENTION

Problems to be Solved by the Invention

As explained above, in the conventional sliding type console box, the gap is formed at a boundary between the case and the shutter, so that if a cover and so on is attached to cover the gap, the gap can be closed. But, since the projections and dents are formed on the upper surface by the cover, there is a possibility that a design is degraded. On the other hand, as in the article storage device for the vehicle, if the projections and dents are deleted, the gap appears, so that there is a situation of degrading a design.

The present invention has been proposed in view of the above situation. Namely, it is an object of the invention to provide a storage device and a cover for the storage device, wherein in the sliding type console box, a gap where an interior structure is seen is covered without degrading a design.

Means for Solving the Problems

In order to attain the objects, a cover member for a storage device for opening and closing an opening of a storage case for storing an item to be stored, comprises an edge frame portion for forming an opening, and a shutter for opening and closing the opening, wherein a gap between the edge frame portion and the shutter moving along a length direction of the edge frame portion is shielded below an upper face of the shutter and above a rail portion where the edge frame portion and the shutter engage.

In a cover member according to the invention, a gap side edge of the shutter extends to a lower direction of the edge frame portion.

In a cover member according to the invention, a gap side edge of the shutter is press-contacted to the rail portion at an edge frame portion side.

In a cover member according to the invention, a gap side edge of the shutter is integrally formed with the shutter.

In a cover member according to the invention, a gap side edge of the shutter is made of a soft material.

In a cover member according to the invention, a gap side edge of the shutter has a light transparency, and a luminous portion is formed near the gap side edge of the shutter.

In a cover member according to the invention, an upper face of the shutter is flush with an upper face of the edge frame portion.

A storage device according to the invention comprises a cover member for the storage device and the storage case for storing the item to be stored, wherein the edge frame portion includes an upper portion, and the rail portion for the edge frame side, located below the upper portion; the shutter includes a shutter main portion covering the opening, a shielding member attached to an edge of the shutter main portion and forming the gap side edge, and a shutter sliding portion located under the shielding member and engaging the rail portion at the edge frame side; and the shielding member extends to between the upper portion and the rail portion at the edge frame side, and inclines.

Advantages of the Invention

The cover member according to the invention includes the edge frame portion for forming the opening for the storage case for storing the item to be stored, and the shutter for opening and closing the opening, wherein the gap between the edge frame portion and the shutter moving along the length direction of the edge frame portion is shielded below the upper face of the shutter and above the rail portion where the edge frame portion and the shutter engage. Namely, since the gap is shielded above the rail portion, the inner structure of the rail portion and so on is not exposed. Also, since it is shielded below the upper surface of the shutter, it does not affect the decoration at the upper side. Accordingly, the gap where the inner structure is exposed can be shielded without impairing the design.

In the cover member according to the invention, the gap side edge of the shutter extends to the lower direction of the edge frame portion. Namely, the gap is shielded by the edge portion of the shutter. Accordingly, the gap where the inner structure is exposed can be shielded without impairing the design.

In the cover member according to the invention, the gap side edge of the shutter is press-contacted to the rail portion of an edge frame portion side. Namely, when the shutter moves, the edge portion and the rail portion of the edge frame side rub, so that resistance force is generated by the friction force. The friction force is determined by the degree of pressure contact. Accordingly, it is possible to adjust in advance the pressing degree and the resistance force, and the resistance in moving the shutter can be set as desired.

In the cover member according to the invention, the gap side edge of the shutter is integrally formed with the shutter. Therefore, for example, when comparing with a two color molding, a cost can be suppressed.

In the cover member according to the invention, the gap side edge of the shutter is made of a soft material. Therefore, it is possible to easily adjust the degree of pressure contact between the edge portion of the shutter and the rail portion of the edge frame side. Also, for example, in case that the shutter has a structure to bend, the edge can be easily deformed according to the deformation of the shutter.

In the cover member according to the invention, the gap side edge of the shutter has a light transparency, and the luminous portion is formed near the gap side edge of the shutter. The light from the luminous portion passes through the gap side edge of the shutter and illuminates the gap. Accordingly, excellent design can be realized.

In the cover member according to the invention, the upper face of the shutter is flush with the upper face of the edge frame portion. Namely, since the entire upper face becomes flat, excellent design can be realized.

The storage device of the invention comprises the cover member for the storage device, and the storage case for storing the item to be stored, wherein the edge frame portion includes an upper portion, and the rail portion for the edge frame side, located below the upper portion; the shutter includes the shutter main portion covering the opening, the shielding member attached to an edge of the shutter main portion and forming the gap side edge, and the shutter sliding portion located under the shielding member and engaging the rail portion at the edge frame side; and the shielding member extends to between the upper portion and the rail portion at the edge frame side, and inclines. Namely, since the shielding member inclines and extends to between the upper portion and the rail portion, the gap is shielded, and the inner structure, such as the rail member and so on, is shielded, and does not affect the decoration on the upper side. Therefore, the gap from which the inner structure exposes can be shielded without impairing the design.

EMBODIMENT OF THE INVENTION

Figure 1:
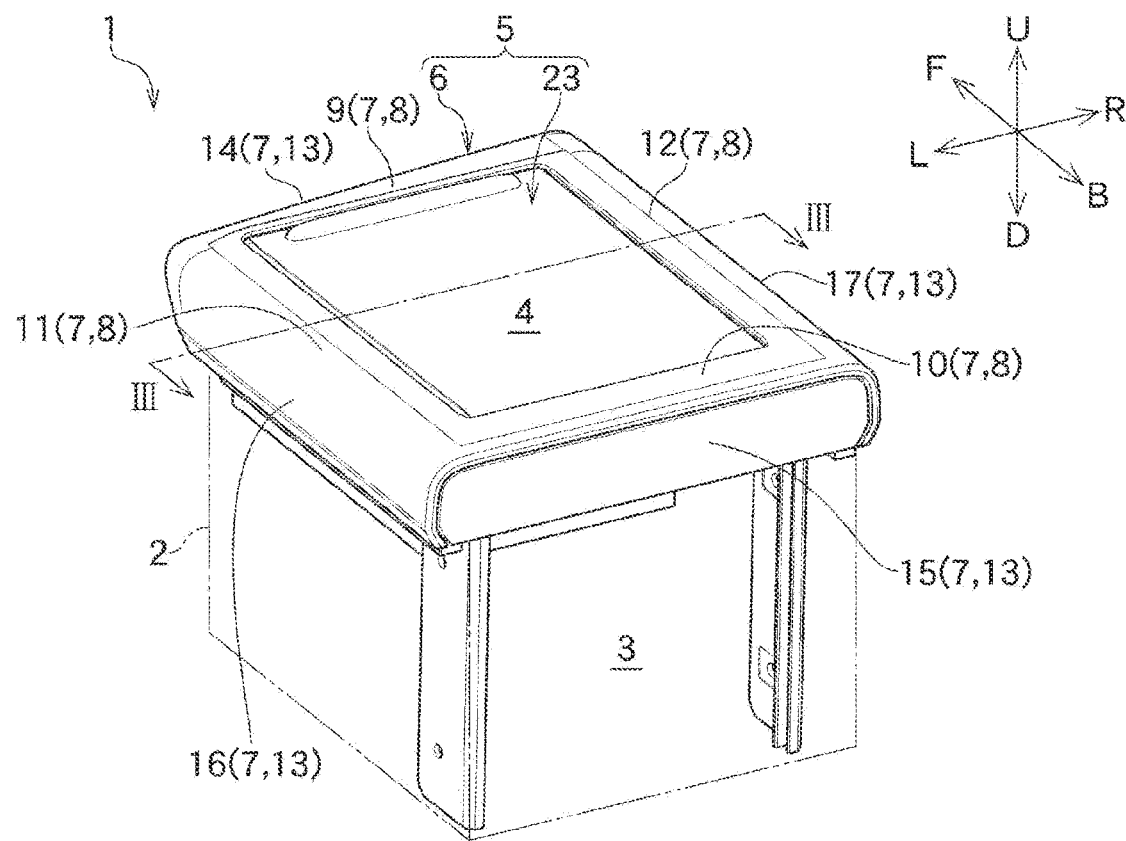
FIG. 1 is an exterior perspective view showing an exterior of a storage device according to an embodiment of the invention.
Figure 2:
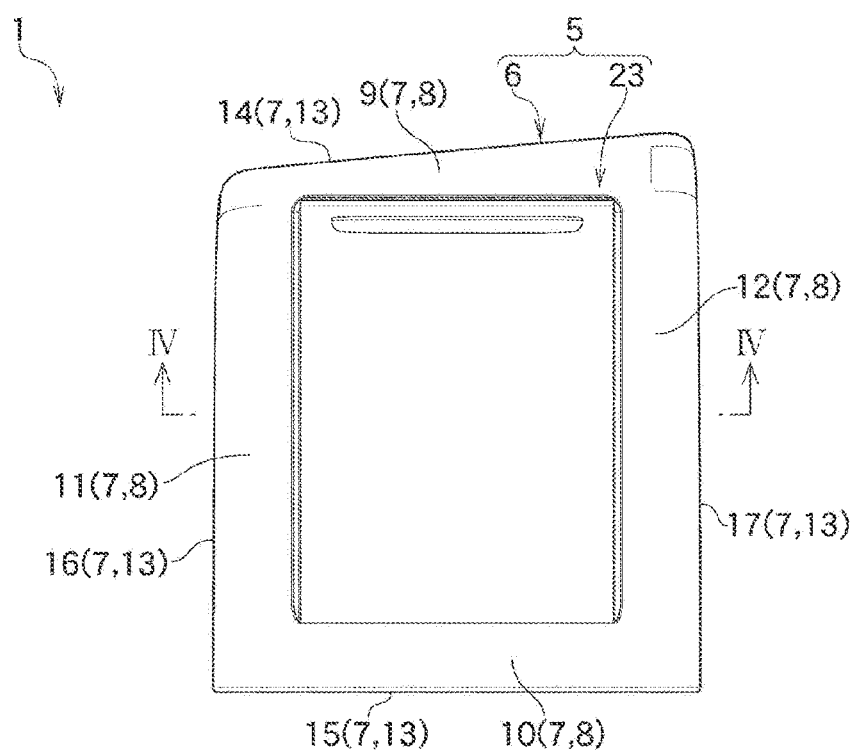
FIG. 2 is a plan view showing, from above, the storage device according to the embodiment of the invention.

Hereinafter, the storage devices according to the embodiments of the invention will be described with reference to the Drawings. FIGS. 1 and 2 show an exterior of a storage device 1 of the present embodiment.

As shown in FIGS. 1 and 2, the storage device 1 comprises a storage case 2 for storing an item to be stored (not shown), a cover 5 for a storage device covering an opening 4 of the storage case. The storage case 2 includes a storage space 3 inside thereof, and the opening 4 at an upper surface thereof, and is attached, for example, to a center console of a vehicle (not shown). Therefore, the storage case 2 has generally a rectangle, as shown in FIG. 1, or a desired shape according to the center console. The cover 5 for the storage device includes an edge frame portion 6 forming an edge of the opening 4 in the storage case 2, and a shatter 23 attached to the edge frame portion 6 and opening and closing the opening 4 by sliding.

Figure 3:
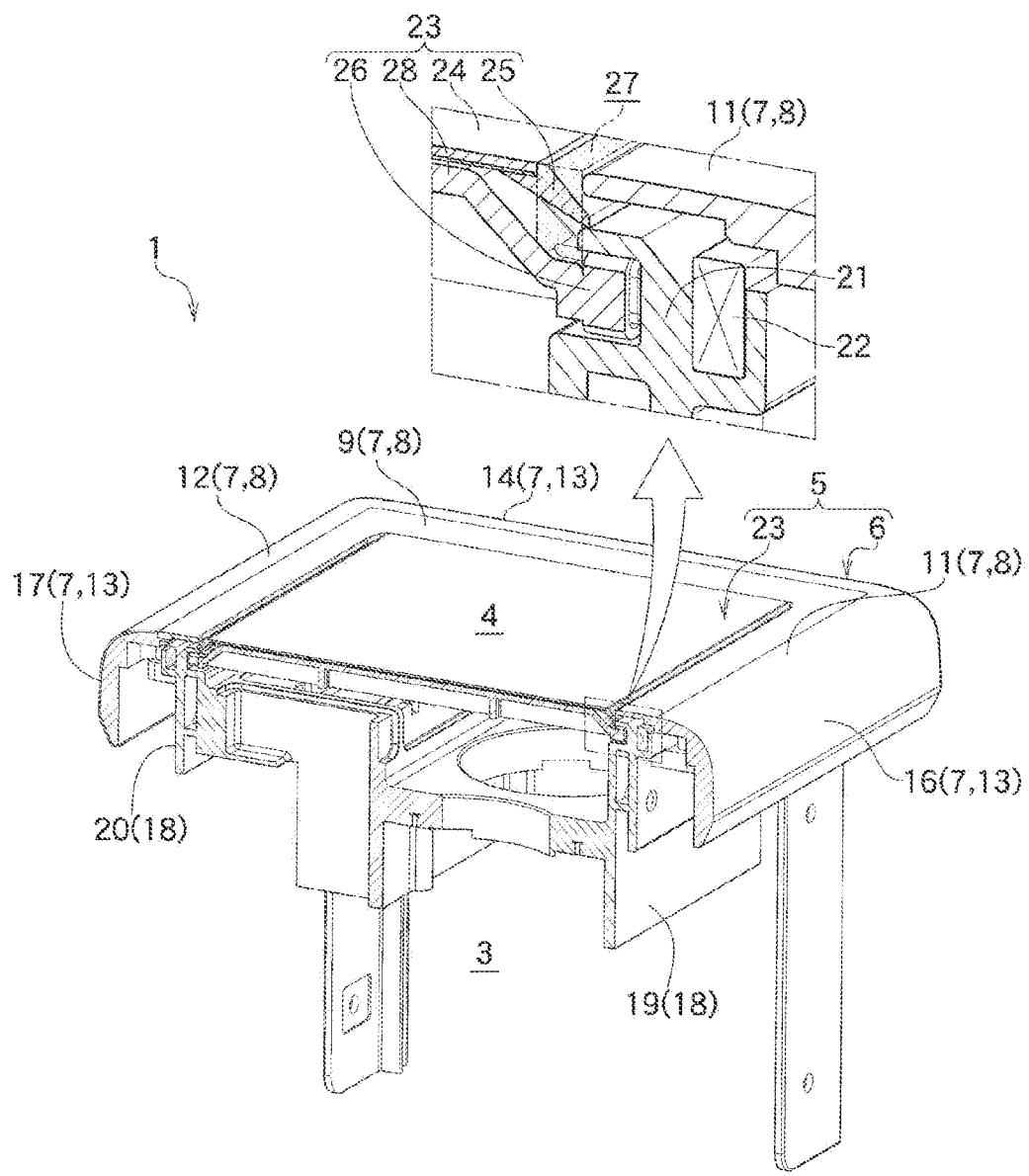
FIG. 3 is a cross sectional perspective view taken along a line in FIG. 1, which is a section of a cover for the storage device according to the embodiment of the invention.
Figure 4:
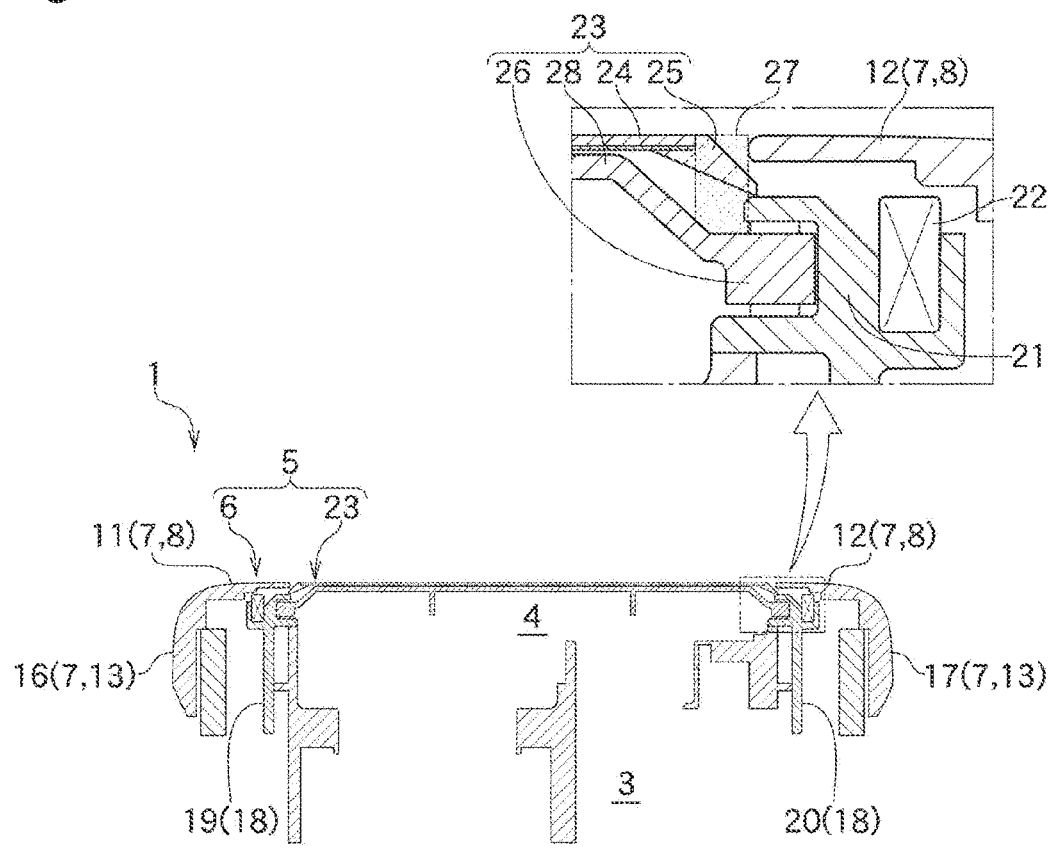
FIG. 4 is a cross sectional view taken along a line IV-IV in FIG. 2, which is a section of the cover for the storage device according to the embodiment of the invention.

Here, the cover 5 for the storage device is explained with reference to the drawings. FIGS. 3 and 4 show a cross section of the cover 5 for the storage device according to the embodiment. Incidentally, in the following explanation, a direction where a shutter 23 is opened is backward; a direction where the shutter 23 is closed is frontward; when viewed from an upper side, directions perpendicular to front-back direction are left direction and right direction; and depth directions of the case are an upper direction and a down direction (refer to FIG. 1).

As shown in FIGS. 1 and 2, the edge frame portion 6 is generally a rectangular frame according to the opening 4, and includes a decoration frame 7 and a base frame 18 (refer to FIGS. 3 and 4). The base frame 18 and decoration frame 7 may be formed separately or integrally.

The decoration frame 7 includes an upper decoration portion 8 forming an upper portion of the cover 5 for the storage device, and side decoration portions 13 extending downwardly from the edges of the upper decoration portion 8. The upper decoration portion 8 includes a front upper decoration portion 9, a rear upper decoration portion 10, a left upper decoration portion 11, and a right upper decoration portion 12. The front upper decoration portion 9, the left upper decoration portion 11 and the right upper decoration portion 12 are connected with each other, and similarly, the rear upper decoration portion 10, the left upper decoration portion 11 and the right upper decoration portion 12 are connected with each other. The side decoration portions 13 include a front side decoration portion 14, a rear side decoration portion 15, a left side decoration portion 16, and a right side decoration portion 17. The front side decoration portion 14, the left side decoration portion 16 and the right side decoration portion 17 are connected with each other, and similarly, the rear side decoration portion 15, the left side decoration portion 16 and the right side decoration portion 17 are connected with each other. Also, the front side decoration portion 14 and the front upper decoration portion 9, the rear side decoration portion 15 and the rear upper decoration portion 10, the left side decoration portion 16 and the left upper decoration portion 11, and the right side decoration portion 17 and the right upper decoration portion 12, are respectively connected.

As shown in FIGS. 3 and 4, a base frame portion 18 is disposed inside the decoration frame 7, and front, rear, left, fright and upper portions, which are outside, are covered by the decoration frame 7. The base frame portion 18 has a plate shape extending up-down directions, and includes a front side frame portion and a rear side frame portion (not shown in the drawings) facing each other through the storage space 3, and a left side frame portion 19 and a right side frame portion 20, facing each other through the storage space 3 in the direction perpendicular to the front and back frame portions. The front side frame portion, the left side frame portion 19 and the right side frame portion 20 are respectively connected together, and similarly, the rear side frame portion, left side frame portion 19 and the right side frame portion 20 are connected together. Each of the left and right side frame portions 19, 20 has a frame side rail portion 21 at the upper end thereof under the left and right upper decoration portions 11, 12. The frame side rail portion 21 is a dent dented toward the left or right direction from the opening 4. The left or right outside the concave portion has a luminous portion 22. The luminous portion 22 includes LED as a light source, and a reflection plate or light transmitting member (omitted in the drawings, respectively).

The shutter 23 includes a flat shutter main portion 24 covering the opening 4, shielding members 25 attached to the left and right edge portions of the shutter main portion 24 and forming edge portions of the shutter 23, and a shutter base 28 covered by the shutter main portion 24, and shutter sliding portions 26 are formed at left and right edges of the shutter base 28. The shutter sliding portions 26 are arranged under the shielding members 25. The shutter base 28 is made such that plural base pieces, each having a plate shape formed in an elongated rectangular shape (not shown) in left and right directions are arranged in the front-back direction, and connecting portions of the base pieces are bent as joints. The shutter main portion 24 is made of, for example, a soft material, and covers the entire outer surface of the shutter base 28. The shielding members 25 are made of, for example, thermoplastic elastomer (TPE), thermosetting elastomers, such as silicone rubber and urethane rubber, and soft materials, such as natural rubber and synthetic rubber, and have a light transmitting ability. The shielding member 25 inclines downwardly as it goes toward the left or right. The shutter sliding portion 26 has a projecting shape toward the left or right from the opening 4.

In a situation where the shutter 23 is attached to the edge frame portion 6, the shutter sliding portion 26 and the frame side rail portion 21 are engaged. The shutter 23 slides along the front-back direction which is a length direction of the left and right upper decoration portions 11, 12 in the decoration frame 7, and bends at the rear side to be rolled up inside the storage case 2. Since the upper surface of the shutter 23 and the upper decoration portion 8 in the edge frame 6 are flush on the same plane, there are no projections and dents. Between the shutter main portion 24 and each of the upper decoration portions 11, 12, a gap 27 is formed, and the gap 27 extends to the frame side rail portion 21 located below. The edge of the shutter in the gap 27 side is formed of the shielding member 25, and the shielding member 25 extends toward between the left or right upper decoration portion 11 or 12 and the frame side rail portion 21, and continues to the lower side of the left or right upper decoration portion 11 or 12. Namely, the gap 27 is shielded by the shielding member 25 at the lower side lower than the upper face of the shutter 23, and the upper side upper than the frame side rail portion 21. The shielding portion 25 is pressed on the upper face of the frame side rail portion 21 by elasticity, and faces the luminous portion 22 between the left or right upper face decorating portion 11 or 12 and the frame side rail portion 21.

As explained above, the present embodiment is formed.

Next, the advantages of the present embodiment will be explained.

As explained above, in the present embodiment, the gap 27 is formed between the shutter main portion 24 and each of the left and right upper decoration portions 11, 12, and the end portions of the shutter 23 at the gap 27 sides are formed by the shielding portions 25. The shielding portions 25 extend toward between each of the left and right upper decorations 11, 12 and the frame side rail portions 21, and come to underside of the left and right upper decoration portions 11, 12 (refer to FIGS. 3 and 4). Namely, since the frame side rail portion 21 is shielded at a portion above the frame side rail portion 21, the inner structure, such as frame side rail portion 21, the shutter sliding portion 26 and so on are not revealed. Also, it is shielded under the upper face of the shutter 23, declaration at the upper side is not affected. Accordingly, the gap where the inner stricter is exposed can be shielded without spoiling a design.

In the present embodiment, the shielding portion 25 is made of a soft material, such as a thermoplastic elastomer. Accordingly, it is easy to adjust the pressing degree between the shielding portion 25 and the frame side rail portion 21. Also, the shielding portion 25 can be easily deformed according to the deformation of the shutter 23.

In the present embodiment, the shielding portion 25 is pressure-contacted to the upper face of the frame side rail portion 21 by elasticity (refer to FIG. 4). Namely, when the shutter 23 slides, the shielding portion 25 rubs against the frame side rail portion 21 to form resistance by friction. The resistance is decided according to the degree of the pressure contact. Accordingly, the resistance can be adjusted together with the degree of pressure contact, so that the resistance when the shutter 23 slides can be desirably decided.

In the present embodiment, the shielding member 25 has light transparency, and faces the luminous portion 22 between the left or right upper decoration portion 11, 12 and the frame side rail portion 21 (refer to FIG. 4). The light from the luminous portion 22 illuminates the gap 27 through the shielding portion 25 from inside. Accordingly, the excellent design can be realized. For example, in case the luminous portion 22 is white and the shielding portion 25 is blue, in a situation when the shutter is closed, the gap 27 is illuminated by blue by the shielding portion 25, but in a situation where the shutter 23 is opened halfway, the gap 27 is illuminated by blue, and on the other hand, from the frame side rail portion 21 at the portion where the shutter 23 is opened, while light leaks by the luminous portion 22. Namely, the boundary between the shutter 23 and the edge frame portion 6 is illuminated by two colors of blue and white, to realize the excellent design. Further, at the boundary between the shutter 23 and the edge frame portion 6, the portion where the shutter 23 is closed is blue, and the portion where the shutter 23 is opened is white, so that the position where the shutter 23 is opened appears remarkably by the boundary of color. Accordingly, the opening condition of the shutter 23 is easily visually recognized. Incidentally, the color of the luminous portion 22 and the shielding portion 25 is optional.

In the present embodiment, since the upper surface of the shutter 23 is flush with the upper face decoration portion 8 in the edge frame portion 6, there are no dents and projections (refer to FIG. 4). Namely, since the entire upper surface of the cover 5 of the storage device is flat, excellent design can be realized.

In another embodiment of the invention, there is no shielding member, and a gap side edge of a shutter has a shape and characteristics corresponding to the shielding member. In this case, the shutter and the gap side edge are formed integrally. Accordingly, for example, as compared with the two color molding, a cost can be suppressed. Also, in another embodiment, shielding members extend to the gaps from the left and right upper decoration members or left and right side frame members. Also, in another embodiment, a frame side rail member has a projection, and a shutter side sliding portion has a dent. In this case, the shielding member is pressure-contacted to a shutter sliding member. Also, in another embodiment, a luminous portion is formed at the shutter. Also, in another embodiment, a shielding member is not press-contacted to an upper face pf the frame side rail portion. Also, in another embodiment, there is no luminous portion, and the shielding portion does not have light transparency. Also, in another embodiment, an upper surface of the shutter and an upper surface of the decoration frame portion are not flush with each other. Also, in another embodiment, the shielding member is not made of a soft material. Also, in another embodiment, the upper surface of the shutter is not flat in a strict meaning, and has dents and projections by pattern or by a structure for bending. Also, in another embodiment, the shutter has bellows.

Herein above, the embodiments of the invention have been explained, the invention is not limited by the above embodiments. Also, the present invention can be modified as long as the present invention does not depart from the subject described in the claims. The present invention can be used for vehicles, for example, ships, rail road trains and air planes.

EXPLANATIONS FOR NUMERALS

1 Storage device
2 Storage case
3 Storage space
4 Opening
5 Cover member for storage device
6 Edge frame portion
7 Decoration frame
8 Upper decoration portion (Upper face portion)
9 Front upper decoration portion
10 Rear upper decoration portion
11 Left upper decoration portion
12 Right upper decoration portion
13 Side decoration portion
14 Front side decoration portion
15 Rear side decoration portion
16 Left side decoration portion
17 Right side decoration portion
18 Base frame portion
19 Left side frame portion
20 Right side frame portion
21 Frame side rail
22 Luminous portion
23 Shutter
24 Shutter main portion
25 Shielding member (Edge at an edge side in the shutter)
26 Shutter sliding portion
27 Gap
28 Shutter base

What is claimed is:

1. A cover member for a storage device for opening and closing an opening of a storage case for storing an item to be stored, comprising:
    an edge frame portion for forming an opening,
    a shutter for opening and closing the opening, and
    a gap between the edge frame portion and the shutter moving along a length direction of the edge frame portion,
    wherein an edge of the shutter at a gap side extends from an upper surface of the shutter toward below the upper surface of the shutter and above a rail portion where the edge frame portion and the shutter engage.

2. A cover member for a storage device for opening and closing an opening of a storage case for storing an item to be stored, comprising:
    an edge frame portion for forming an opening, and
    a shutter for opening and closing the opening,
    wherein a gap between the edge frame portion and the shutter moving along a length direction of the edge frame portion is shielded below an upper face of the shutter and above a rail portion where the edge frame portion and the shutter engage, and
    wherein a gap side edge of the shutter has a light transparency, and a luminous portion is formed near the gap side edge of the shutter.

3. A cover member for a storage device for opening and closing an opening of a storage case for storing an item to be stored, comprising:
    an edge frame portion for forming an opening,
    a shutter for opening and closing the opening, and
    a gap between the edge frame portion and the shutter moving along a length direction of the edge frame portion,
    wherein an edge of the shutter at a gap side extends from an upper surface of the shutter toward below the upper surface of the shutter and above a rail portion where the edge frame portion and the shutter engage, and
    wherein the shutter includes a shutter base covering the opening, sliding portions provided on two sides of the shutter base, each slidably engaging the rail portion of the edge frame portion, a shutter main portion provided on the shutter base, and shielding members provided on two sides of the shutter main portion, each extending obliquely downwardly from the shutter main portion to be located above the sliding portion so that the shielding member shields the gap.

4. A cover member according to claim 3, wherein the edge frame portion includes a base frame having the rail portions engaging the sliding portions of the shutter, and a decoration frame disposed above the base frame to have a space with respect to the rail portions, the shielding members being slidably disposed in the space between the decoration frame and the base frame so that the gap between the edge frame portion and the shutter is covered by one of the shielding members.

5. A cover member according to claim 3, wherein the edge of the shutter at the gap side extends to a lower direction of the edge frame portion.

6. A cover member according to claim 3, wherein the edge of the shutter at the gap side is press-contacted to the rail portion of an edge frame portion side.

7. A cover member according to claim 3, wherein the edge of the shutter at the gap side is integrally formed with the shutter.

8. A cover member according to claim 3, wherein the edge of the shutter at the gap side is made of a soft material.

9. A cover member according to claim 3, wherein an upper face of the shutter is flush with an upper face of the edge frame portion.

10. A storage device comprising:
    the cover member for the storage device and the storage case for storing the item to be stored, according to claim 3,
    wherein the edge frame portion includes an upper portion, and the rail portion for an edge frame side, located below the upper portion.

* * * * *